United States Patent
Hayashi et al.

(10) Patent No.: US 6,358,600 B1
(45) Date of Patent: *Mar. 19, 2002

(54) SHEET FOR PROTECTING PAINT FILM

(75) Inventors: Keiji Hayashi; Tsuyoshi Inoue; Kenichi Shibata; Kenji Sano; Mitsuyoshi Shirai; Mitsuru Horada; Hiroshi Sugawa, all of Osaka; Komaharu Matsui, Kanagawa; Takeshi Eda; Hiroshi Ueda, both of Hyogo, all of (JP)

(73) Assignees: Nitto Denko Corporation, Osaka (JP); Kansai Paint Co., Ltd., Hyogo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 4 days.

This patent is subject to a terminal disclaimer.

(21) Appl. No.: 09/095,894

(22) Filed: Jun. 11, 1998

(30) Foreign Application Priority Data

Jun. 26, 1997 (JP) .............................................. 9-187788
Feb. 5, 1998 (JP) ............................................ 10-041326

(51) Int. Cl.⁷ ................................................ B32B 3/26
(52) U.S. Cl. .............................. 428/317.3; 428/317.1; 428/343; 428/354; 428/355; 442/156
(58) Field of Search ................................. 428/343, 354, 428/355, 317.3, 317.1; 442/156

(56) References Cited

U.S. PATENT DOCUMENTS

| 3,908,650 A | * | 9/1975 | Dunshee | 128/156 |
| 4,251,584 A | * | 2/1981 | Van Engelen et al. | 428/159 |
| 4,427,737 A | * | 1/1984 | Cilentro | 428/315.7 |
| 4,919,999 A | * | 4/1990 | Maria Van Soom | 428/284 |
| 5,601,917 A | | 2/1997 | Matsui et al. | 428/356 |
| 5,612,135 A | | 3/1997 | Matsui et al. | 428/343 |
| 5,747,132 A | | 5/1998 | Matsui et al. | 428/41.7 |
| 5,810,960 A | | 9/1998 | Matsui et al. | 156/305 |
| 5,914,282 A | * | 6/1999 | Dunshee | 442/76 |
| 6,030,702 A | * | 2/2000 | Matsui et al. | 428/343 |
| 6,037,054 A | * | 3/2000 | Shirai et al. | 428/356 |
| 6,083,613 A | * | 7/2000 | Hayashi et al. | 428/315.7 |

FOREIGN PATENT DOCUMENTS

EP 0 519 278 12/1992

OTHER PUBLICATIONS

Database WPI, Section Ch, Week 9735, 6/97.
Patent Abstracts of Japan, vol. 014, No. 149 (C–0705), Mar. 22, 1990.

* cited by examiner

*Primary Examiner*—Blaine Copenheaver
*Assistant Examiner*—Christopher Paulraj
(74) *Attorney, Agent, or Firm*—Sughrue, Mion, Zinn Macpeak & Seas, PLLC

(57) ABSTRACT

A sheet for protecting a paint film which does not deteriorate or discolor the paint film even when the sheet is adhered to protect the paint film under the condition containing acidic rainwater or detergent and can maintain the adhered state over an extended-period of time without peeling off is disclosed. The sheet for protecting a paint film comprises a porous substrate and a pressure-sensitive adhesive layer formed on one surface of the porous substrate. The sheet has an air permeability in a direction of sheet thickness of 20,000 sec/100 cc or more and a moisture permeability in a direction of sheet thickness of 2,000 $g/m^2 \cdot 24$ hr or more. The sheet for protecting a paint film further comprises a porous substrate and a pressure-sensitive adhesive layer formed on one surface of the porous substrate, wherein the porous substrate has an ultraviolet transmission of 10% or less at a wavelength of from 190 to 370 nm.

6 Claims, No Drawings

SHEET FOR PROTECTING PAINT FILM

FIELD OF THE INVENTION

The present invention relates to a sheet for protecting a paint film which is difficult to deteriorate or discolor the paint film and thus is suitable for the surface protection of body, parts and the like of automobiles.

BACKGROUND OF THE INVENTION

As a method for protecting automobiles and their parts which have been painted against the attack by various suspended matters such as dust and rainwater or other harmful matters that can damage, dull or discolor the paint film during shipping on truck or ship to overseas or other remote places, there has been heretofore known a method of applying a coating material mainly comprised of wax in a thickness of from 5 to 40 µm. However, this method has some disadvantages. For example, it is difficult to form a wax coat with a uniform thickness, making it impossible to provide a uniform protection. Further, a wax coat is easily stained. Moreover, a wax coat is easily affected by acidic rainwater. Further, wax or other matters penetrate through the coated paint film to cause discoloration thereof. It takes much time and labor to apply and remove the wax coat. Further, this method requires the use of a solvent and the disposal of a waste liquid, causing environmental pollution.

On the other hand, various surface protective sheets comprising a support and a pressure-sensitive adhesive layer provided thereon have been known. A sheet comprising a support and a radiation-curing pressure-sensitive adhesive layer having a lowered glass transition point or a rubber pressure-sensitive adhesive layer made of a polyisobutylene or the like formed thereon has been proposed as a surface protective sheet for an adherend having a paint film, as disclosed in, for example, JP-A-2-199184 and JP-A-6-73352 (The term "JP-A" as used herein means an "unexamined published Japanese patent application"). This sheet can overcome the above-described problems.

However, this proposal is disadvantageous in that a detergent from window washer or the like penetrates into the paint film through wrinkle portions unavoidably developed during covering the adherend with the surface protective sheet and then remains in bubble portions unavoidably developed during covering the adherend to cause the paint film to swell and hence discolor or deteriorate, giving stains that are not easily removed. Such stains are remarkable particularly when those are attributable to wrinkle portions which have been developed in the direction of gravitational force.

As a result of extensive studies to overcome the above-described problems, it was found that the deterioration or discoloration of a paint film is attributed to the evaporation and the concentration of water from acidic water or detergent which has unavoidably penetrated into the paint film during or after adhering the protective sheet to the paint film.

SUMMARY OF THE INVENTION

In the light of the fact that the penetration of acidic rainwater or detergent is unavoidable, an object of the present invention is to provide a sheet for protecting a paint film, which does not deteriorate or discolor the paint film even if the protective sheet is adhered to protect the paint film under the condition containing acidic rainwater or detergent and thus can maintain the adhered state to the paint film over a long period of time without peeling off the protective sheet.

The sheet for protecting a paint film according to the present invention comprises a porous substrate and a pressure-sensitive adhesive layer formed on one surface of the porous substrate, wherein the sheet has an air permeability in a direction of sheet thickness of 20,000 sec/100 cc or less and a moisture permeability in a direction of sheet thickness of 2,000 $g/m^2 \cdot 24$ hr or more, and also the porous substrate may have an ultraviolet transmission of 10% or less at a wavelength of 190 to 370 nm.

Even if acidic rainwater, detergent or the like penetrates into the interface between the sheet for protecting a paint film of the present invention and the paint film through wrinkle portions on the sheet, the water can evaporate away from a large area of the protective sheet due to the air permeability and moisture permeability of the porous substrate. Thus, evaporation or concentration of water is difficult to occur in local portions such as entrapped bubble portions.

As a result, even if the protective sheet is maintained to adhere to automobiles or other painted materials, the deterioration or discoloration of the paint film covered with the sheet can be prevented. Further, even if the protective sheet is adhered to painted materials under the condition containing acidic rainwater, detergent or the like, it is not necessary for the sheet to be peeled off and re-adhered. Thus, the sheet for protecting a paint film of the present invention can be applied to painted bodies having a vertical face.

Further, if the sheet of the present invention comprises a porous substrate which cuts ultraviolet rays, it is difficult to cause deterioration of substrate or adhesive layer even if the sheet is allowed to stand over an extended period of time under high ultraviolet intensity conditions such as outdoor. In other words, the sheet of the present invention can fairly maintain the initial strength and exhibits an excellent peelability. Thus, the sheet of the present invention is difficult to cause breakage of substrate or adhesive remaining and can be easily peeled off the painted material.

DETAILED DESCRIPTION OF THE INVENTION

The sheet for protecting a paint film of the present invention comprises a porous substrate and a pressure-sensitive adhesive layer formed on one surface of the porous substrate. The sheet has an air permeability in a direction of sheet thickness of 20,000 sec/100 cc or less and a moisture permeability in a direction of sheet thickness of 2,000 $g/m^2 \cdot 24$ hr or more. From the standpoint of the evaporatability of entrapped water in a large area, the air permeability of the sheet is preferably 10,000 sec/100 cc or less, and more preferably 5,000 sec/100 cc or less, and the moisture permeability of the sheet is preferably 3,000 $g/m^2 \cdot 24$ hr or more, and more preferably 5,000 $g/m^2 \cdot 24$ hr or more.

Another embodiment of the sheet for protecting a paint film of the present invention comprises a porous substrate and a pressure-sensitive adhesive layer formed on one surface of the porous substrate, wherein the porous substrate has an ultraviolet transmission of 10% or less at a wavelength of 190 to 370 nm. From the standpoint of prolonged maintenance of high peelability free from breakage of the sheet or adhesive remaining by preventing deterioration of the substrate or pressure-sensitive adhesive layer, the ultraviolet transmission of the porous substrate at a wavelength of from 190 to 370 nm is preferably 8% or less, more preferably 5% or less, and most preferably 1% or less.

Accordingly, the porous substrate which can be used is any appropriate porous material which at least has the air permeability and the moisture permeability fallen within the above defined range or the ultraviolet transmission fallen within the above defined range. In general, a sheet of processed fiber, such as nonwoven fabrics, woven fabrics or papers, can be used. From the standpoint of the simultaneous accomplishment of the prevention of deterioration or discoloration of the paint film and the good peelability of the sheet after accomplishment of protection, a sheet showing the air permeability and moisture permeability fallen within the above defined ranges and also the ultraviolet transmission falling within the above defined range is preferably used.

The fiber used to constitute the sheet of processed fiber can be any appropriate fiber. A fiber having excellent water resistance, etc. is preferable. Examples of such a fiber include fiber made of thermoplastic resins such as polyolefins (e.g., polyethylene, polypropylene, etc., which may be used alone or as mixtures thereof), polyesters and polyamides, regenerated or semisynthetic fibers such as rayon and cuprammonium rayon silk and cellulose acetate, natural fibers such as cotton, silk and wool, and mixtures thereof (mixed yarn).

A particularly preferred example of the porous substrate is a nonwoven fabric, particularly made of a thermoplastic resin fiber. The thickness of the porous substrate is not specifically limited. However, from the standpoints of strength, protection of a paint film and prevention of deformation of a paint film by the stress developed at the end of the sheet adhered to the paint film, the basis weight of the porous substrate is preferably 500 g/m$^2$ or less, more preferably 5 to 300 g/m$^2$ or less, and most preferably 10 to 200 g/m$^2$.

The porous substrate having the air permeability and moisture permeability fallen within the above defined ranges can be obtained by controlling a porous structure such as a pore diameter or a thickness. Further, the porous substrate having the ultraviolet transmission fallen within the above defined range can be obtained such that ultraviolet light screening particles are contained and dispersed in a porous substrate such as a sheet of processed fiber in an appropriate method.

Examples of the method for dispersing the ultraviolet light screening particles in a porous substrate include a method of applying a coating solution containing ultraviolet light screening particles to the surface of fibers constituting the porous substrate to form a coating film thereon, and a method of forming a coating film on the surface of fibers and using the coated fibers to form a porous substrate.

Further examples of the method for dispersing the ultraviolet light screening particles in a porous substrate include a method of forming a plastic containing the ultraviolet light screening particles into fibers and using the fibers to form a porous substrate having the ultraviolet light screening particles dispersed therein, and a method comprising the combined use of the above methods. Accordingly, the method for dispersing the ultraviolet light screening particles in a porous substrate is not specifically limited, and any appropriate method can be used.

The coating solution used above may be a dispersion obtained by mixing a binder component comprising an appropriate resin such as acrylic resin, urethane resin or polyester resin, with the ultraviolet light screening particles in the presence of an appropriate medium such as an organic solvent or water. The coating solution may be commercially available as ZE-123 or ZR-100 (trade name, produced by Sumitomo Osaka Cement Co., Ltd.).

The application of the coating solution can be conducted by any appropriate coating method such as dipping, spraying, gravure coating or reverse-roll coating. The thickness of the coating film may appropriately be determined. In general, the thickness of the coating film is 40 μm or less, preferably 20 μm or less, and more preferably 0.5 to 10 μm, from the standpoint of treatment efficiency or reduction in thickness.

On the other hand, the formation of the porous substrate having ultraviolet light screening particles dispersed therein can be conducted by, for example, a method of mixing the ultraviolet light screening particles with a thermoplastic resin, and then subjecting the resulting mixture to an appropriate nonwoven fabric-forming method such as melt blowing method or span bond method to form fibers and then accumulating the fibers.

The ultraviolet light screening particles which can be used are appropriate particles which reflect or absorb ultraviolet rays, such as titanium white, red oxide, zinc oxide, alumina, tin oxide or carbon black. In particular, titanium white and zinc oxide are preferable from the standpoint of effect of screening ultraviolet rays. The particle diameter of the ultraviolet light screening particles may appropriately be determined. In general, from the standpoint of the stability or prolonged maintenance of the dispersed state of the particles, the particle diameter is preferably 0.005 to 5 μm, more preferably 0.01 to 1 μm, and more preferably 0.02 to 0.5 μm, based on an average particle diameter.

In the present invention, the porous substrate or its constituent fibers or the coating film may further comprise additives such as antioxidant or ultraviolet absorber, if required and necessary, for the purpose of preventing its deterioration. If the porous substrate or coating film is made of a thermoplastic resin, the incorporation of such an antioxidant or ultraviolet absorber is particularly effective to prevent deterioration.

The pressure-sensitive adhesive layer may be formed using an appropriate pressure-sensitive adhesive such as rubber pressure-sensitive adhesives or acrylic pressure-sensitive adhesives. In particular, the preferred rubber pressure-sensitive adhesive is a rubber polymer free of or having a small content of aliphatically unsaturated bond from the standpoint of prolonged stability of properties.

Examples of the rubber polymer include polyisobutylene, butyl rubber, A-B-A type block polymer such as styrene-ethylene.butylene copolymer-styrene (SEBS), styrene-ethylene.epropylene copolymer-styrene (SEPS), styrene-butadiene-styrene (SBS) or styrene-isoprene-styrene (SIS), hydrogenated product thereof, and ethylene-vinyl acetate copolymer.

The pressure-sensitive adhesive can be prepared using one or more base polymers, preferably two or more base polymers each having different molecular weight distribution. If the base polymer is an A-B-A type block polymer, those each having different molecular weight distribution or styrene content may be used in combination. Alternatively, such an A-B-A type block polymer may be used in combination with an A-B type diblock polymer such as styrene-ethylene.butylene copolymer (SEB), styrene-ethylene.propylene copolymer (SEP), styrene-butadiene (SB) or styrene-isoprene (SI).

In preparing the pressure-sensitive adhesive, an appropriate tackifier such as terpene resin (e.g., α-pinene polymer, β-pinene polymer, diterpene polymer, α-pinene.phenol copolymer), hydrocarbon resin (e.g., aliphatic resin, aromatic resin, aliphatic-aromatic copolymer resin), rosin, cumarone-indene resin, (alkyl)phenol resin or xylene resin may be blended with the base polymer, if required and necessary, for the purpose of controlling the adhesive properties or like.

Further, the adhesive properties or other properties can also be controlled by the incorporation of an appropriate softening agent depending on the base polymer, e.g., low molecular weight polyisobutylene or polybutene for polyisobutylene or paraffin oil for A-B-A type block polymer, if required and necessary. In addition, an appropriate additive such as filler, pigment, antiaging agent or stabilizer may be incorporated in the pressure-sensitive adhesive, if required and necessary.

The pressure-sensitive adhesive layer may be applied to all over the surface of the substrate. However, the pressure-sensitive adhesive layer is preferably in the form of a porous layer from the standpoint of the prevention of deterioration or discoloration of the paint film due to the accomplishment of the desired air permeability and moisture permeability of the sheet for protecting a paint film. The formation of the porous adhesive layer can be conducted by any appropriate method such as a method of subjecting a pressure-sensitive adhesive to melt blowing or curtain spray to form fibers and then accumulating the fibers in the form of, for example, a nonwoven fabric or a method of partly applying a pressure-sensitive adhesive to the substrate in a dot or stripe pattern.

The pressure-sensitive adhesive layer may also be a porous layer formed by subjecting a pressure-sensitive adhesive layer comprising a continuous film to a perforation treatment. In this embodiment, a liquid which has penetrated into the holes in the pressure-sensitive adhesive layer is contacted with the adjacent porous substrate, and diffuses in the porous substrate. The perforation treatment may extend to the porous substrate.

In particular, a porous pressure-sensitive adhesive layer obtained by a melt blowing method which comprises melting a pressure-sensitive adhesive, and blowing the molten adhesive onto the substrate in the form of fiber through a high pressure air is preferable because deviation in adhesive force, air permeability and moisture permeability is small, thereby attaining the desired adhesive force and water evaporatability at the same time. The pressure-sensitive adhesive to be used in the melt blowing method is preferably a hot melt type pressure-sensitive adhesive which can be extrusion coated. In particular, a pressure-sensitive adhesive comprising the A-B-A type block polymer as a base polymer is preferably used.

The formation of the sheet for protecting a paint film can be conducted according to the conventional method for the formation of an adhesive sheet, such as a method of applying a solvent solution or heat-fused solution of a pressure-sensitive adhesive to the porous substrate or a method of transferring a pressure-sensitive adhesive layer formed on a separator onto the porous substrate. The thickness of the pressure-sensitive adhesive layer thus formed may appropriately be determined. The thickness is generally 3 to 100 μm, preferably 7 to 70 μm, and more preferably 10 to 50 μm.

The sheet for protecting a paint film which is preferable from the standpoint of adhesion workability on adherends such as automobiles and water evaporatability has an apparent density of 0.8 g/cm$^3$ or less, preferably 0.7 g/cm$^3$ or less, and more preferably 0.6 g/cm$^3$ or less. If desired and necessary, the pressure-sensitive adhesive layer thus formed may be protected by temporarily adhering a separator or the like thereto until it is put into practical use.

The sheet for protecting a paint film of the present invention is preferably used for the surface protection or paint film protection of a body or their parts such as bumper of automobiles, coated with a paint film such as polyester-.melamine paint, alkyd.emelamine paint, acryl.melamine paint, acryl.urethane paint or acryl.polyacid curing agent paint, or other coated products such as coated steel plate, against the collision of fine particles or attack by chemicals.

In particular, the sheet for protecting a paint film of the present invention can advantageously be used where acidic rainwater or chemicals such as acidic liquid tends to easily penetrate into the protective sheet because the adhesion-covering work of the protective sheet to the adherend is conducted outdoor or in the factory, etc., or where acidic rainwater or detergent from window washer tends to easily penetrate into the interface between the sheet and the paint film during the outdoor storage, etc.

The present invention will be further described in more detail by reference to the following examples, but it should be understood that the present invention is not construed as being limited thereto. Unless otherwise indicated, all parts, percents, ratios and the like are by weight.

EXAMPLE 1

100 Parts of SEBS (Kraton G-1657, produced by Shell Chemical Co., Ltd.) and 40 parts of a hydrogenated petroleum resin (ARKON P-100, produced by Arakawa Chemical Industries, Ltd.) were kneaded at 160° C. with a kneader. The chip thus kneaded was then melt-blown through a dice to form fibers, and the fibers were then spread and accumulated on a nonwoven fabric (ELTAS N01020, produced by ASAHI CHEMICAL INDUSTRY CO., LTD.) to form a nonwoven fabric-like porous pressure-sensitive adhesive layer having a basis weight of 20 g/m$^2$. Thus, a sheet for protecting a paint film, having an apparent density of 0.2 g/cm$^3$ was obtained. The melt blowing was conducted at a dice temperature of 200° C., a hot air temperature of 210° C., a hot air pressure of 1.0 to 2.0 kg/cm$^2$ and a conveyor linear speed of 3 m/min. The average diameter of fibers in the porous pressure-sensitive adhesive layer was about 20 μm.

EXAMPLE 2

A toluene solution of a rubber pressure-sensitive adhesive made of a mixture of 90 parts of a polyisobutylene having a viscosity-average molecular weight of 1,000,000 and 10 parts of a polyisobutylene having a viscosity-average molecular weight of 80,000 was applied to a Japanese paper in a striped pattern, and then dried at 50° C. for 5 minutes to obtain a sheet for protecting a paint film, having a 15 μm thick adhesive layer and having an apparent density of 0.52 g/cm$^3$.

EXAMPLE 3

The same toluene solution of a rubber pressure-sensitive adhesive as used in Example 2 was uniformly applied to a separator, and then dried at 50° C. for 5 minutes to form a pressure-sensitive adhesive layer having a thickness of 15 μm. The pressure-sensitive adhesive layer thus formed was then transferred onto a nonwoven fabric (ELTAS P03040, produced by ASAHI CHEMICAL INDUSTRY CO., LTD.). Holes having a diameter of about 0.5 mm were formed over the entire pressure-sensitive adhesive layer in a proportion of 6/cm$^2$ to obtain a sheet for protecting a paint film, having an apparent density of 0.17 g/cm$^3$.

EXAMPLE 4

A sheet for protecting a paint film, having an apparent density of 0.2 g/cm$^3$ was prepared in the same manner as in Example 1 except that SEPS (Kraton GRP6906, produced by Shell Chemical Co., Ltd.) was used instead of SEBS.

Comparative Example 1

The same toluene solution of a rubber pressure-sensitive adhesive as used in Example 2 was uniformly applied to a polyethylene-based porous film (Porum #70, produced by Tokuyama Co., Ltd.) having a thickness of 60 μm, and then dried at 50° C. for 5 minutes to form a pressure-sensitive adhesive layer having a thickness of 15 μm. Thus, a sheet for protecting a paint film, having an apparent density of 0.85 g/cm³ was obtained.

Comparative Example 2

A sheet for protecting a paint film, having an apparent density of 0.85 g/cm³ was prepared in the same manner as in Example 1 except that a polyethylene-based porous film was used instead of the nonwoven fabric.

Evaluation Test 1

The sheets for protecting a paint film, obtained in the above examples and comparative examples were then subjected to the following tests.

Air Permeability

Using an air permeability tester (Gurley Dendometer, manufactured by Kumagawa Riki Kogyo K.K.), the time required for a circular sample having a diameter of 30 mm to pass 300 cc of air therethrough was determined.

Moisture Permeability

Using a moisture permeability tester (Type L-80-4000 Water Vapor Permeability Tester, manufactured by YSSY), the amount of water vapor which passes through a circular sample having a diameter of 80 mm was determined.

Stain with Acidic Rainwater

The sheet for protecting a paint film was adhered to an acryl.melamine paint (Magicron, tradename manufactured by Kansai Paint Co., Ltd.) film on an iron plate. An artificial acidic rainwater made of an aqueous solution of sulfuric acid having a pH of 1 was blown against the protective sheet for 10 minutes. The iron plate thus treated was then allowed to stand at 80° C. for 2 hours. The protective sheet was then peeled off the paint film to see if the paint film was discolored.

Stain by Penetration of Acidic Rainwater

An artificial acidic rainwater made of an aqueous solution of sulfuric acid having a pH of 1 was blown against an acryl.melamine paint film on an iron plate for 10 minutes. The sheet for protecting a paint film was then adhered to the paint film on the iron plate. The iron plate was then allowed to stand at 40° C. for 48 hours. The protective sheet was then peeled off the paint film to see if the paint film was discolored.

The results obtained are shown in Table 1 below.

TABLE 1

| Example No. | Air permeability (sec/100 cc) | Moisture permeability (g/m² · 24 hr) | Stain with acid rainwater | Stain by penetration of acid rainwater |
|---|---|---|---|---|
| Example 1 | 2 or less | 3,000 or more | None | None |
| Example 2 | 350 | 2,100 | None | None |
| Example 3 | 10 | 3,000 or more | None | None |
| Example 4 | 2 or less | 3,000 or more | None | None |
| Comparative Example 1 | 40,000 or more | 14 | None | Observed |
| Comparative Example 2 | 1,500 | 1,300 | None | Observed |

Table 1 shows that the sheet for protecting a paint film can stably protect the paint film in practical use without causing stain such as discoloration even when acidic rainwater penetrate thereinto.

EXAMPLE 5

100 parts of a polypropylene (PP-3546G, produced by Exxon Co., Ltd.), 1 part of titanium white (produced by ISHIHARA SANGYO KAISHA, LTD.) and 0.2 parts of a weathering stabilizer (produced by Ciba Geigy Co., Ltd.) were kneaded. The resulting mixture was subjected to melt blowing to form fibers, and the fibers were then accumulated to have a basis weight of 70 g/m². The fibers thus accumulated were then calender-rolled to form a nonwoven fabric. A nonwoven fabric-like porous pressure-sensitive adhesive layer having a weight of 40 g/m² made of fibers of a mixture of 100 parts of SEBS and 20 parts of a hydrogenated petroleum resin was then formed on the nonwoven fabric obtained above in the same manner as in Example 1 to obtain a sheet for protecting a paint film having an apparent density of 0.2 g/cm².

EXAMPLE 6

A coating solution containing zinc white (ZE-123) was applied to the surface of a nonwoven fabric (ELTAS E01040, produced by ASAHI CHEMICAL INDUSTRY CO., LTD.) by a printing method using a gravure coater to obtain a porous substrate having a coating film provided thereon. A pressure-sensitive adhesive layer having a thickness of 15 μm which had been uniformly applied to a separator in the same manner as in Example 2 was then transferred onto the porous substrate obtained above. Holes having a diameter of about 0.5 mm were formed over the entire pressure-sensitive adhesive layer in a proportion of 6/cm² to obtain a sheet for protecting a paint film, having an apparent density of 0.35 g/cm³.

EXAMPLE 7

A nonwoven fabric (ELTAS E01040) was dipped in a coating solution obtained by mixing 100 parts of an acrylic resin and 0.2 parts of titanium white (produced by Ishihara Techno Co., Ltd.) in the presence of toluene, and then dried to obtain a porous substrate having a coating film formed thereon. The same adhesive as used in Example 5 was then applied to the porous substrate in a striped pattern by means of a hot melt coater to obtain a sheet for protecting a paint film, having an apparent density of 0.35 g/cm².

Comparative Example 3

The same nonwoven fabric-like porous adhesive layer as used in Example 5 was provided on a nonwoven fabric (ELTAS P03070, produced by ASAHI CHEMICAL INDUSTRY CO., LTD.) to obtain a sheet for protecting a paint film, having an apparent density of 0.2 g/cm³.

Comparative Example 4

A pressure-sensitive adhesive layer was formed on a polyethylene-based porous film in the same manner as in Example 6. The pressure-sensitive adhesive layer was then subjected to drilling to obtain a sheet for protecting a paint film, having an apparent density of 0.85 g/cm³.

Evaluation Test 2

The sheets for protecting a paint film or their porous substrates obtained in Examples 5 to 7 and Comparative Examples 3 and 4 were examined for air permeability, moisture permeability, stain with acid rainwater and stain by penetration of acidic rainwater in the same manner as above and were also subjected to the following tests.

Ultraviolet Transmission

Using a spectrophotometer (manufactured by Shimadzu Corp.), the porous substrate was determined for ultraviolet transmission at a wavelength of 365 nm.

Initial Adhesive Force and Initial Adhesive Remaining

The sheet for protecting a paint film was adhered to a painted plate having a melamine-alkyd coating film formed thereon at 23° C. by reciprocating a rubber roller thereon. The assembly was then allowed to stand for 30 minutes. The protective sheet was then peeled off the paint film on the painted plate at an angle of 180° and a speed of 300 mm/min to determine the adhesive force. Thereafter, the remaining of adhesive on the painted plate was determined.

Adhesive Force and Adhesive Remaining After Exposure

On the other hand, a painted plate having the same protective sheet as above adhered thereto was exposed in a sunshine carbon weatherometer (produced by Suga Test Instruments Co., Ltd.) for 500 hours, taken out of the weatherometer, and then allowed to stand at 23° C. and 65% RH for 3 hours. The protective sheet was then measured for adhesive force. After peeling, the remaining of adhesive on the painted plate was determined.

The results obtained are shown in Table 2 below.

TABLE 2

| Example No. | Air permeability (sec/100 cc) | Moisture permeability (g/m² · 24 hr) | Ultraviolet transmission (5) | Stain with acid rainwater | Stain by penetration of acidic rainwater | Adhesive force (g/20 mm) Initial | Adhesive remaining Exposed |
|---|---|---|---|---|---|---|---|
| Example 5 | 2 or less | 3,000 or more | 9 | None | None | 450 | None |
| Example 6 | 2 or less | 3,000 or more | 3 | None | None | 210 | None |
| Example 7 | 2 or less | 3,000 or more | 5 | None | None | 280 | None |
| Comparative Example 3 | 2 or less | 3,000 or more | 76 | None | None | 410 | Observed |
| Comparative Example 4 | 2 or less | 3,000 or more | 80 | None | None | 600 | Observed |

Table 2 shows that the sheet for protecting a paint film of the present invention can sufficiently protect the paint film and fairly maintain the initial state even when used under conditions where acidic rainwater or the like tends to penetrate and it is easily exposed to ultraviolet rays or the like, and can easily and stably be peeled after attaining the objective protection, thus demonstrating excellent practical value of the sheet.

While the invention has been described in detail and with reference to specific embodiments thereof, it will be apparent to one skilled in the art that various changes and modifications can be made therein without departing from the spirit and scope thereof.

What is claimed is:

1. A sheet for protecting a paint film, said sheet comprising a porous substrate and a pressure-sensitive adhesive layer formed on one surface of the porous substrate, wherein the sheet has an air permeability in a direction of sheet thickness of 20,000 sec/100 cc or less and a moisture permeability in a direction of sheet thickness of 2,000 g/m²·24 hr or more.

2. The sheet for protecting a paint film as claimed in claim 1, wherein said porous substrate has an ultraviolet transmission of 10% or less at a wavelength of 190 to 370 nm.

3. The sheet for protecting a paint film as claimed in claim 1, wherein said sheet has an apparent density of 0.8 g/cm³ or less.

4. The sheet for protecting a paint film as claimed in claim 1, wherein said porous substrate comprises a sheet of processed fiber and said pressure-sensitive adhesive layer comprises a porous pressure-sensitive adhesive layer.

5. A sheet for protecting a paint film, said sheet comprising a porous substrate and a pressure-sensitive adhesive layer on the porous substrate wherein said sheet has an air permeability in a direction of sheet thickness of 20,000 sec/100 cc or less and a moisture permeability in a direction of sheet thickness of 2,000 g/m²·24 hr or more, and said porous substrate has an ultraviolet transmission of 10% or less at a wavelength of 190 to 370 nm.

6. The sheet for protecting a paint film as claimed in claim 5, wherein said sheet has an apparent density of 0.8 g/cm³ or less.

* * * * *